(12) United States Patent
Albsmeier et al.

(10) Patent No.: US 11,942,891 B2
(45) Date of Patent: Mar. 26, 2024

(54) DYNAMIC FREQUENCY TO VOLTAGE RATIO FOR REGULATOR MACHINE

(71) Applicant: Kohler Co., Kohler, WI (US)

(72) Inventors: Eric Albsmeier, Sheboygan, WI (US); Douglas Dorn, Sheboygan Falls, WI (US); Patrice Mallejac, Kohler, WI (US)

(73) Assignee: KOHLER CO.

( * ) Notice: Subject to any disclaimer, the term of this patent is extended or adjusted under 35 U.S.C. 154(b) by 18 days.

(21) Appl. No.: 17/749,817

(22) Filed: May 20, 2022

(65) Prior Publication Data
US 2022/0399840 A1 Dec. 15, 2022

Related U.S. Application Data

(60) Provisional application No. 63/210,840, filed on Jun. 15, 2021.

(51) Int. Cl.
*H02P 9/02* (2006.01)
(52) U.S. Cl.
CPC ..................... *H02P 9/02* (2013.01)
(58) Field of Classification Search
CPC .......................................................... H02P 9/02
See application file for complete search history.

(56) References Cited

U.S. PATENT DOCUMENTS

| | | |
|---|---|---|
| 3,436,633 A | 4/1969 | Hemmenway et al. |
| 3,575,256 A * | 4/1971 | Jania ...................... G05D 13/00 180/176 |
| 3,952,138 A | 4/1976 | Nanjyo et al. |
| 4,533,863 A | 8/1985 | Luhn et al. |
| 5,225,764 A | 7/1993 | Falater |
| 5,504,417 A | 4/1996 | Kern et al. |
| 5,698,968 A | 12/1997 | Takagi et al. |
| 6,078,203 A | 6/2000 | Zafarana et al. |

(Continued)

FOREIGN PATENT DOCUMENTS

| CN | 102983802 B | 4/2015 |
|---|---|---|
| CN | 112332440 A | 2/2021 |

(Continued)

OTHER PUBLICATIONS

Extended European Search Report from European Patent Application No. 22177754.3, dated Nov. 4, 2022, 13 pages.

*Primary Examiner* — Sean Gugger
(74) *Attorney, Agent, or Firm* — The Belles Group, P.C.

(57) ABSTRACT

A voltage regulator for a generator having a dynamic voltage-to-frequency (V/F) ratio includes a memory, a voltage calculator, and a selection module. The memory is configured to store a plurality of voltage-frequency curves for the generator. The voltage calculator is configured to receive data indicative of an output of the generator and configured to determine a resistance value from the output of the generator and a voltage value from the output of the generator. The selection module configured to select a voltage-frequency curve from the plurality of voltage-frequency curves in response to the resistance value and configured to select a voltage-frequency ratio from the selected voltage-frequency curve in response to the voltage value. An output adjustment for the generator is determined in response to the selected voltage-frequency ratio.

18 Claims, 6 Drawing Sheets

(56) References Cited

U.S. PATENT DOCUMENTS

| | | |
|---|---|---|
| 6,130,523 A | 10/2000 | Hughes et al. |
| 6,707,170 B2 | 3/2004 | Fukaya |
| 6,738,269 B2 | 5/2004 | Nomiya et al. |
| 7,743,616 B2 | 6/2010 | Renken et al. |
| 7,825,641 B2 | 11/2010 | Eaton et al. |
| 8,334,678 B2 | 12/2012 | Aoyama |
| 9,154,068 B2 | 10/2015 | Andrejak et al. |
| 9,574,511 B2 | 2/2017 | Kim et al. |
| 9,584,055 B2 | 2/2017 | Cooper et al. |
| 9,595,901 B2 | 3/2017 | Andrejak et al. |
| 9,628,010 B2 | 4/2017 | Clarke et al. |
| 10,554,161 B2 | 2/2020 | Liao et al. |
| 10,720,866 B2 | 7/2020 | Blackwelder et al. |
| 10,734,930 B2 | 8/2020 | Vänskä et al. |
| 10,784,686 B2 | 9/2020 | Schneider et al. |
| 10,804,826 B2 | 10/2020 | Taniguchi et al. |
| 2009/0218991 A1* | 9/2009 | Eaton ............... H02P 9/305 322/28 |
| 2013/0147410 A1* | 6/2013 | Head ............... H02P 1/52 318/400.42 |
| 2018/0131302 A1* | 5/2018 | Frampton ............ H02P 9/04 |

FOREIGN PATENT DOCUMENTS

| | | |
|---|---|---|
| DE | 102008039593 A1 | 3/2009 |
| JP | 3303015 B2 | 8/1996 |
| JP | 3505706 B2 | 3/2004 |
| JP | 3944057 B2 | 4/2007 |
| JP | 2020067029 A | 4/2020 |
| KR | 20180011901 A | 2/2018 |
| SU | 991573 A1 | 1/1983 |
| SU | 1127065 A1 | 11/1984 |
| SU | 1343537 A1 | 10/1987 |
| SU | 1628179 A1 | 2/1991 |

* cited by examiner

ROTOR ASSEMBLY

DYNAMIC FREQUENCY TO VOLTAGE RATIO FOR REGULATOR MACHINE

This application claims priority benefit of Provisional Application No. 63/210,840 filed Jun. 15, 2021, which is hereby incorporated by reference in its entirety.

TECHNICAL FIELD

This disclosure relates in general to the field of electric machines including motors and generators, and in particular, the control of a voltage in an electric machine.

BACKGROUND

An electric machine may be an electromagnetic rotating machine that includes a rotor and a stator. The rotor and stator are positioned on opposite sides of an air gap through which a magnetic field is present and magnetic flux flows between the rotor and the stator. The magnetic field may be created by permanent magnets. While other examples are possible, the electric machine may be a motor or a generator. The generator, which may be referred to as an engine-generator set or a genset, may include a power source (e.g., an engine) and an alternator or another device for generating electrical energy or power from mechanical energy. The motor, on the other hand, receives electrical energy and converts it to mechanical energy by producing load torque.

BRIEF DESCRIPTION OF THE DRAWINGS

Exemplary embodiments are described herein with reference to the following drawings.

DETAILED DESCRIPTION

An electric machine such as a generator may include permanent magnets for the field of the main generator and/or exciter. The permanent magnets may be included in either the rotor or the stator. For example, the electric machine may include a main generator with a wound-field and an exciter with a permanent magnet field. Other embodiments of electrical machines include permanent magnet brush-type DC machines, permanent magnet brushless DC machines, series-wound or universal machines, induction AC machines, synchronous AC machines, synchronous reluctance machines, switched reluctance machines, among others. Any machine may be used as a motor, selectively between a motor and a generator, or entirely as a generator.

A voltage regulator may control the generator output through feedback control. For example, the voltage regulator may receive sensor data of an electrical parameter (e.g., voltage, current, power). The sensor data may be compared to a reference value based on a target output of the generator. The target output may be a set value, or a variable value determined by the voltage regulator. Based on the comparison, the voltage regulator may determine a difference (e.g., error signal) for controlling (increasing or decreasing) another parameter (e.g., field current, rotational velocity, air gap, field to armature alignment, or others). In one example, the field current is adjusted by increasing or decreasing the current flow to an exciter stator, resulting in a lower or higher voltage at the armature in the main generator stator.

Figure 1:
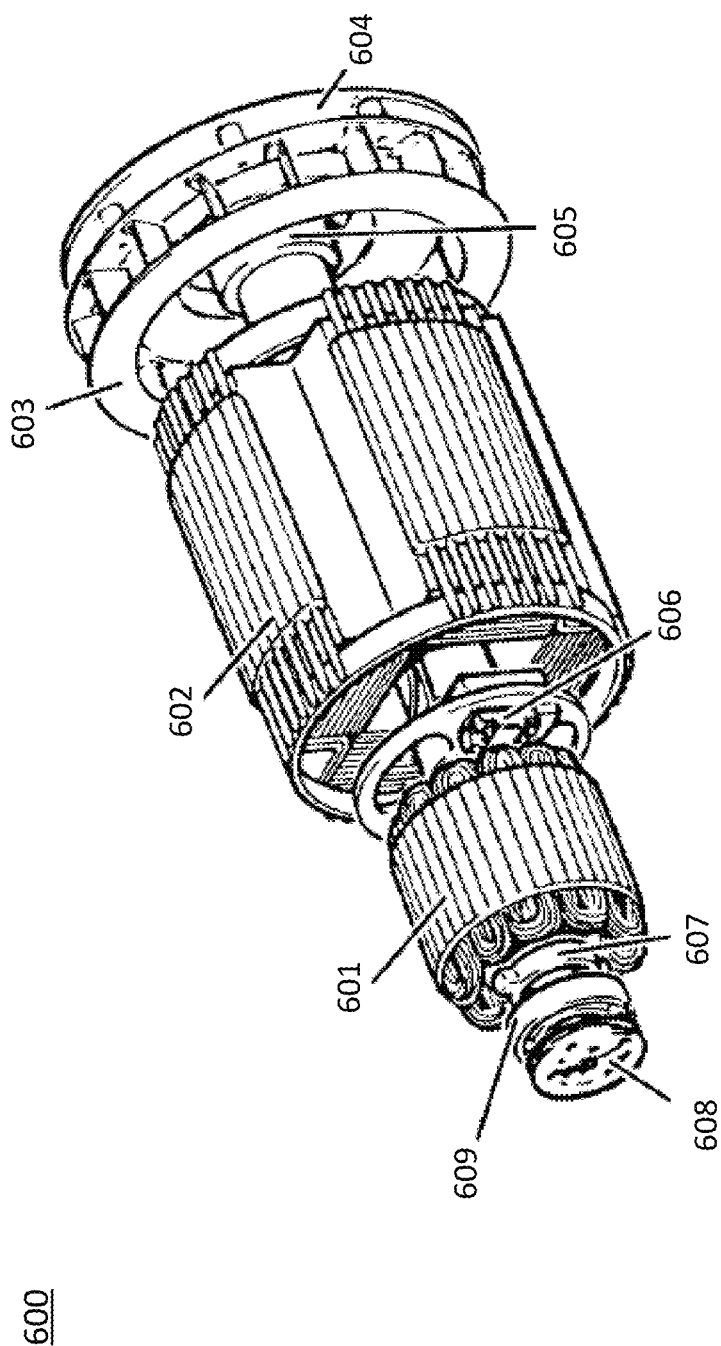
FIG. 1 illustrates an example rotor assembly.

FIG. 1 illustrates an example rotor assembly 600 for an electric machine. The rotor assembly 600 may include an exciter armature 601, a main field coil assembly 602, a cooling fan 603, drive discs 604, a coupling 605, a rotor controller 606, a sensor 607, a rotor communication device 608, and a rotor bearing 609. Additional, different, or fewer components may be included.

The coupling 605 and/or drive discs 604 couple the rotor assembly 600 to a prime mover such as an engine. The coupling 605 may be a fixed connection between the rotor assembly 600 and the engine via drive discs 604. Alternate devices that connect the rotor assembly 600 to the engine include a splined shaft, a compliant member, or a fully constrained connection may be utilized under appropriate conditions.

It should be noted that while engine is used as a term to describe the prime mover, converting fuel to a rotational speed and torque applied to a generator, any apparatus capable of providing mechanical torque and rotation or of requiring mechanical torque and rotation may be coupled to an electrical machine, operating as a motor or a generator. An electrical machine may also provide torque without causing rotation, such as to hold a position against a load. Thus, rotation is not required to define a device as an electrical machine.

In general, the generator or genset, may generates electrical energy or power from mechanical energy. The motor, on the other hand, receives electrical energy and converts it to mechanical energy by producing load torque. A power source or prime mover produces a driving torque. This torque will oppose the load torque and cause rotation of the rotor of the electric machine at some velocity. The prime mover may be an internal combustion engine.

An internal combustion engine may have performance characteristics where the available torque may vary with the rotational velocity. As such, the engine may not provide adequate torque at lower velocity. If the load torque for the engine is greater than the available torque, speed decreases.

The electric machine may be coupled to an internal combustion engine as the prime mover, operating at some nominal velocity. The electric machine may have an electrical load as electrical energy. This load will be converted to a mechanical energy as torque. As larger loads are applied, greater torque may be created. As greater load torque is applied to the engine, velocity or speed may decrease. If torque is not reduced, the engine speed may continue to decrease. It may be advantageous to reduce the load to a level where the engine may overcome this torque and bring the speed back to the nominal value.

Further, the engine maybe be configured for a constant speed or a variable speed that varies based on the load. Likewise, the alternator may be included in a variable speed generator.

In any of these examples, a voltage regulator may provide feedback control to maintain the desired output target voltage of the electric machine. In addition, the resistance of the load impacts the response of output control. The following embodiments provide systems and techniques for maintaining a desired speed in an electrical machine under a load resistance that varies in time.

An electrical load may have a real component and a reactive component. The electric load includes the real component, measured in electric watts, which is directly related to the resulting load torque. The real component, or watts, can be calculated as the product of the real component of the load current and the applied voltage. The real component of the load current is dependent on the resistive component or resistance of the load and the applied voltage, where current equals voltage divided by resistance (Ohm's Law).

Electrical load has the mathematical relationship where watts is equal to the squared value of applied voltage divided by the resistance of the load (Joule's Law). Further, power can be seen to be proportional to the voltage squared, and inversely proportional to resistance.

The electrical load applied to an electric machine may have a resistive component, resulting in an applied load torque to the prime mover. The applied torque will be dependent on the resistance of the load and the applied voltage. The applied torque may then be modified by changing the applied voltage or the resistance of the load. For example, to reduce the load torque, the applied voltage could be reduced.

If an electrical load is applied to an electric machine, there will be a resulting load torque applied to the prime mover. If the applied torque (predetermined or empirically determined) to cause a drop in speed, it may be concluded the applied torque is greater than that which the prime mover can provide at the operating speed/velocity. If the applied voltage is reduced sufficiently, the torque may drop to a level where the prime mover can maintain the desired speed. Thus, a change in resistance of the load impacts the implied torque on the prime mover, and operation of the voltage regulator is adjusted to maintain the desired speed and target voltage of the electrical machine.

For the rotor assembly 600 of an electrical machine shown in FIG. 1, the engine turns the rotor assembly 600, rotating the exciter armature 601 along with the field coil assembly 602. The engine may also turn the cooling fan 603. The cooling fan 603 may force air across the field coil assembly 602, the rotor controller 606, and/or the exciter armature 601, any of which may expel heat as current flows through the windings or other electrical components.

Some electrical machines, such as sealed machines, liquid-cooled machines and high-efficiency machines, may not require a cooling fan to maintain the internal components to a stable temperature. In addition, some electrical machines, such as induction machines, brushless DC machines, and switched reluctance machines, may contain fewer rotating elements in the rotor assembly. Further, some electrical machines, such as large synchronous machines and brush-type DC machines may contain more or different rotating elements in the rotor assembly.

Figure 2:
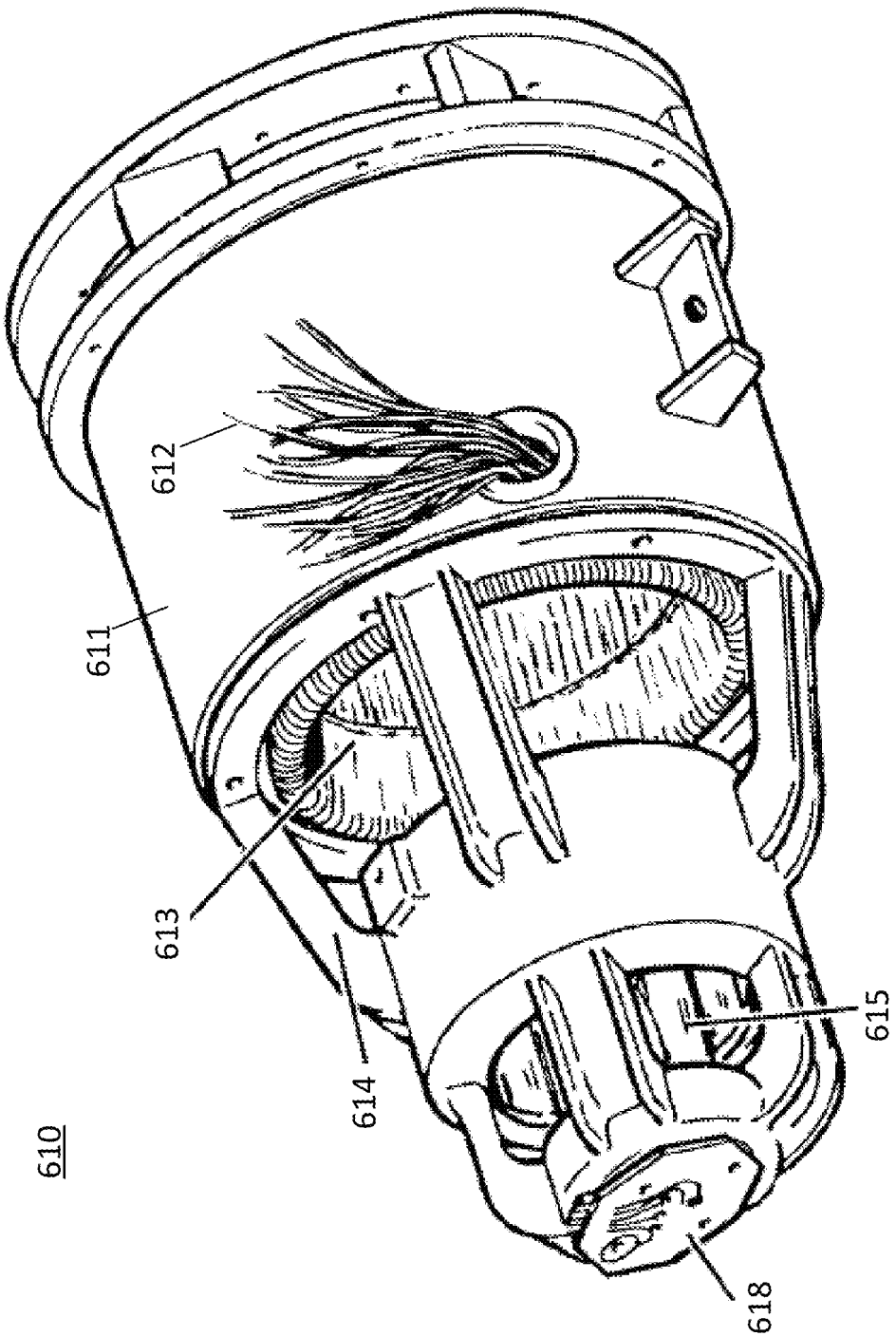
FIG. 2 illustrates an example stator assembly.

FIG. 2 illustrates an example rotor stator assembly 610 for an electric machine. The stator assembly 610 includes a stator chassis 611, a set of leads 612, armature 613, an end bracket 614, an exciter field assembly 615, and a stator communication device 618. Additional, different, or fewer components may be included.

The rotor assembly 600 may fit inside the stator assembly 610. The exciter field assembly 615 may be aligned with the exciter armature 601. The stator chassis 611 may be aligned with the field coil assembly 602.

In the example machine, the exciter armature 601 includes exciter armature windings, and the exciter field assembly 615 includes permanent magnets as a source of magnetic flux. As the exciter armature windings rotate within the stator assembly 610, through the magnetic field, one or more currents are generated in the exciter armature windings. Two or more wires or other electrical conductors connect the exciter armature windings to the field coil assembly 602 through the rotor controller 606. The current from the exciter armature windings supplies current to the field coil assembly 602.

In the example machine, a stator communication device 618 provides a signal to a rotor communication device 608, which then affects the amount of current passing through the rotor controller 606 to the field coil assembly 602.

For the example stator assembly 610, the stator includes the armature windings 613 and the permanent magnet exciter field 615. As the field coil assembly 602 rotates within the stator assembly 610, and the magnetic field generated by the field coil assembly 602, currents are induced in the armature 613. The current from the windings 613 is carried by the leads 612 to a load.

While the term windings may refer to conductive wires wrapped around a material, which may be ferromagnetic, the term windings may be extended to refer to any arrangement of conductive materials which encompasses a volume through which magnetic flux may flow. Similarly, coils, commonly referring to a grouping of conductive wires wound around a bobbin, ferrous member or other core, may be extended to include conductive material in multiple paths around a point in space.

Figure 3:
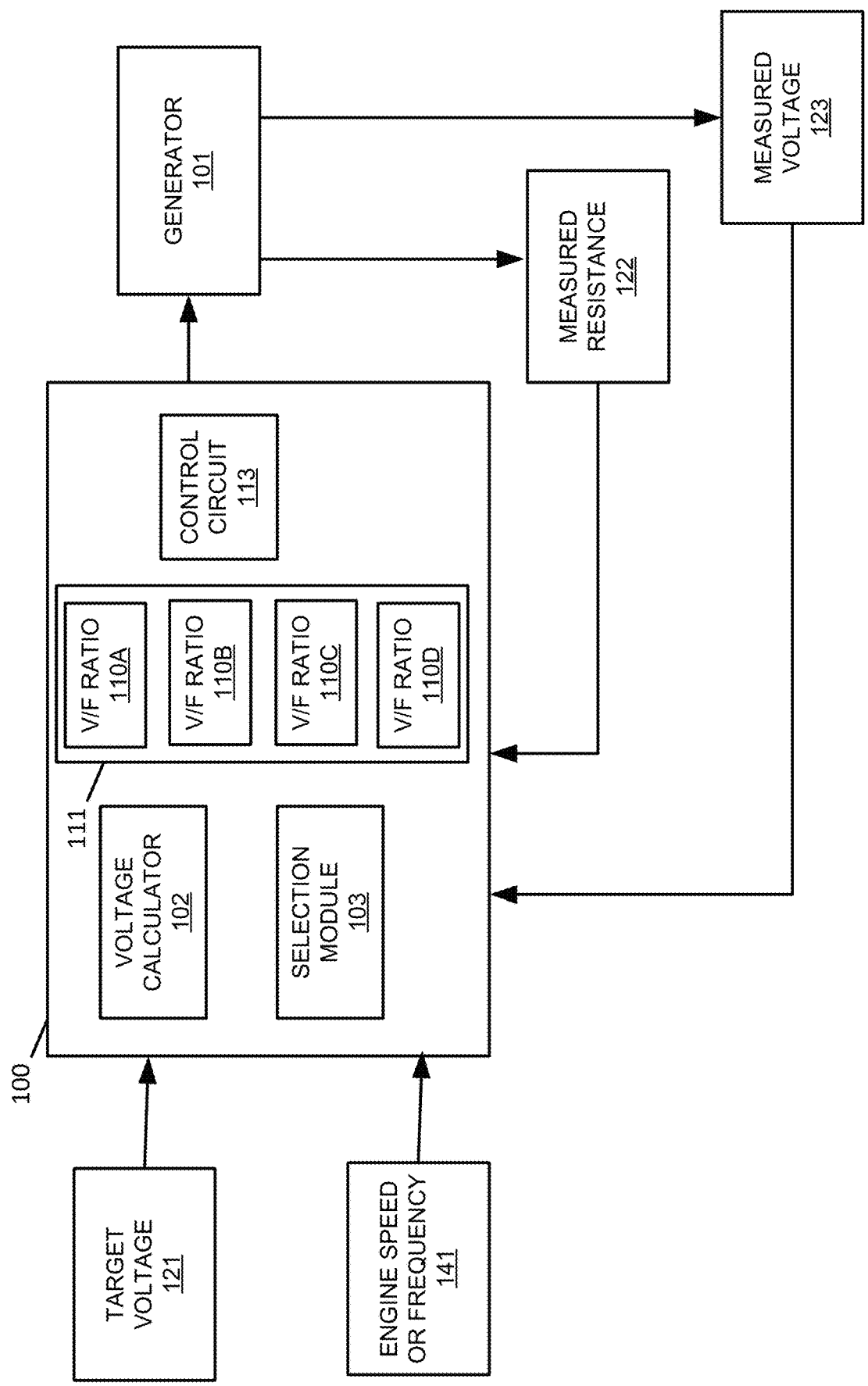
FIG. 3 illustrates an example voltage regulator for generator having a dynamic frequency to voltage ratio.

FIG. 3 illustrates an example voltage regulator 100 for a generator having a dynamic voltage-to-frequency (V/F) ratio. The voltage regulator 100 includes a voltage calculator 102, a selection module 103, and a memory 111 or other data storage devices for multiple V/F ratios 110A-D. Calculations, determinations, and identifications described as being performed at the voltage regulator 100 may be performed specifically by the voltage calculator 102. Data values received at or calculated by the voltage regulator 100 may be stored in the memory. In addition, the voltage regulator 100 may include a control circuit 113, which may be referred to as a controller, for dynamically adjusting a target output of the generator in response to the V/F ratios 110A-D. This function may alternatively be performed at the voltage calculator 102 (i.e., the voltage calculator 102 and the control circuit 113 may be implemented by a single device). Additional, different, or fewer components may be included.

The voltage regulator 100 is coupled to a generator 101. The voltage regulator 100 may be electrically and physically coupled to a generator 101. The generator 101 provides power to a load (e.g., one or more circuits of a home, building, boat, vehicle, etc.). The generator 101 may include one or more sensing circuits for measured electrical parameters of the generator 101 or of the load connected to the generator 101.

For example, a resistance sensing circuit generates sensor data for resistance as measured resistance 122. The resistance may be the resistance of a load. The resistance may be a component of the complex impedance of the load, including a reactance component. The resistance may be measured at the output of the generator 101. The resistance may be a value representing a percentage of a reference value. Thus, the voltage regulator 100 receives resistance data for an output of the generator 101.

In addition, a voltage sensing circuit generates sensor data for the output of the generator 101 as measured voltage 123. Other sensing circuits such as a current sensing circuit, a power sensing circuit, or others are possible. The voltage may be measured at the output of the generator 101. Thus, the voltage regulator 100 receives voltage data for an output of the generator.

As an alternative to the measured resistance 122, the resistance may be a predetermined value. For example, certain loads may have predefined resistances. For example, a motor may be associated with a first predetermined resistance, a light may be associated with a second predetermined resistance, and other devices may have other predetermined resistances.

The voltage regulator 100 (e.g., control circuit 113) receives a target voltage 121 (or target output) for the generator 101. The target voltage 121 may be stored in memory of the voltage regulator 100. That is, the target voltage 121 may be associated with the rated output of the generator 101. Alternatively, the target voltage 121 may be received from a user input. The user may provide an input to a keypad, button, or other device at the generator 101 or the voltage regulator 100. The user may enter information on a computing device (e.g., laptop, mobile phone, etc.) that is configured to transmit the user input to the voltage regulator 100. Additional information regarding user inputs and communication from other examples herein may be implemented by the voltage regulator 100.

The target voltage 121 may be dependent on a frequency of the output signal or speed of the engine that rotates the prime mover of the generator 101. The frequency may be measured by a rotation sensor generating a feedback signal for an output shaft of the engine, a control signal for the engine, or measured by an electrical sensor detecting one of the internal parameters of the generator (e.g., frequency of output from the exciter armature 601), or from the main output of the generator 101. The control signal may be from an input device for setting the speed of the engine or rotor. The feedback signal may be generated by a sensor such as a rotation sensor. The rotation sensor may magnetically, optically or mechanically measure the rotation of the output shaft. Thus, the feedback signal may be indicative of the speed of the output shaft. Also, the feedback signal could be derived from the output of the generator 101. The voltage regulator 100 may calculate shaft output characteristics such as speed or torque as a function of the output voltage or current. The voltage regulator 100 (e.g., selection module 103) selects a voltage-frequency ratio based on the resistance data.

Alternatively, the voltage regulator may receive frequency or engine speed 141 from a sensor or from an engine control unit (ECU).

The voltage regulator 100 may query a database or a curve using the frequency or engine speed 141 to determine the voltage-frequency ratio. The voltage regulator 100 calculates an output adjustment for the generator in response to the selected voltage-frequency ratio and the voltage data.

Figure 4:
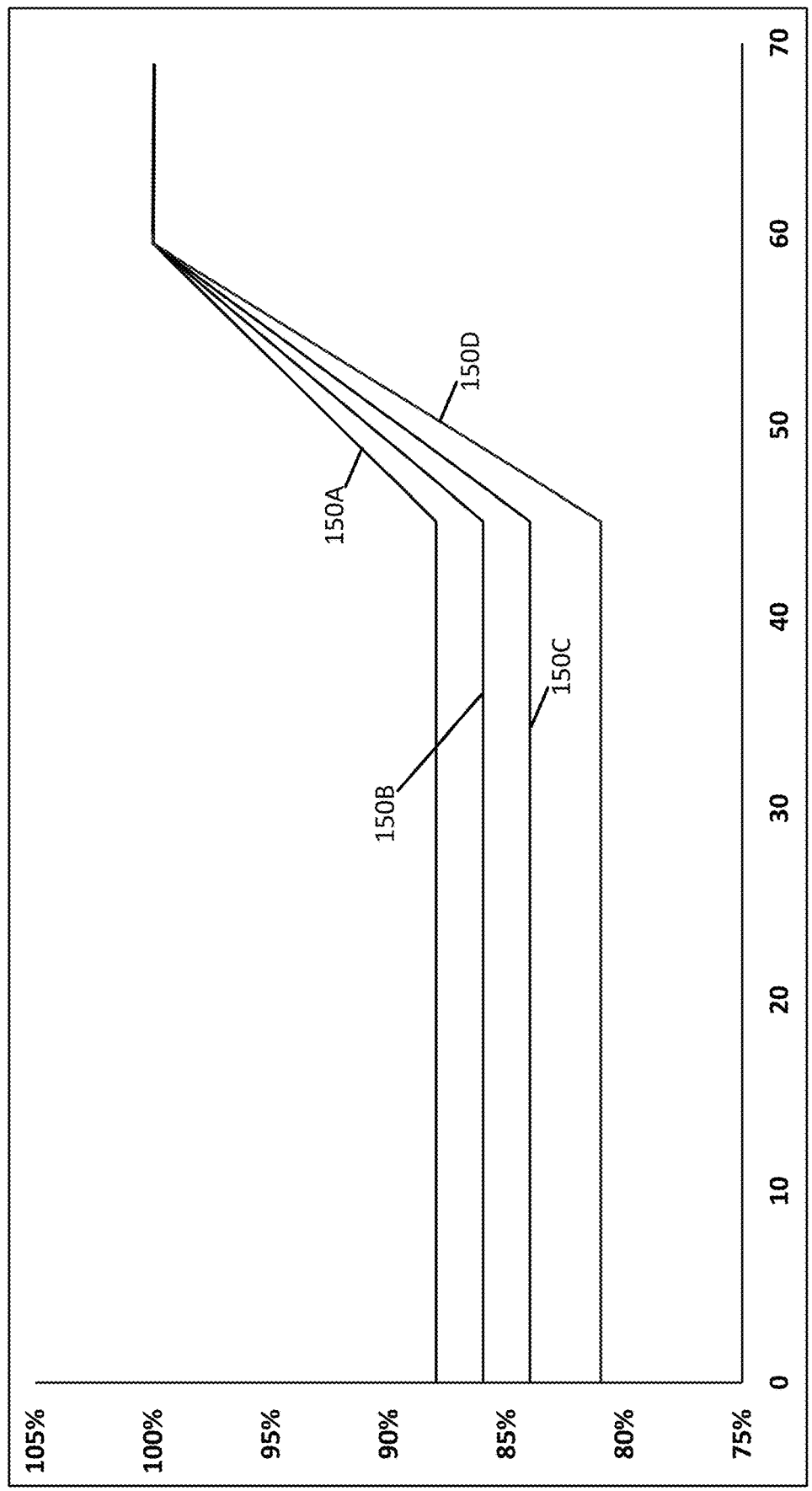
FIG. 4 illustrates an example a dynamic frequency to voltage ratio.

FIG. 4 illustrates an example a dynamic frequency to voltage ratio chart. The horizontal axis is the frequency of the output signal or speed of the engine. The horizontal axis values may be the relative value (percent of, fraction of) compared to a reference for the respective signal. For any given frequency, a voltage value is determined from the point on the selected ratio chart or curve, as defined by the vertical axis. The voltage value may be a percentage of nominal voltage. The nominal voltage may be the set target voltage. Thus, when the corresponding voltage value is 90%, for a particular frequency value, then 90% of the set target voltage is used. The voltage regulator 100 may calculate the output adjustment based on the nominal voltage and add the target output for voltage regulation to the output adjustment.

The voltage regulator 100 may store multiple voltage-frequency curves as shown in FIG. 4, as curves 150A-D. The voltage regulator 100 (e.g., selection module 103) selects one of the voltage-frequency curves in response to the measured resistance 122. For example, the voltage regulator 100 may compare the measured resistance 122 to one or more reference values or ranges. When the measured resistance 122 is in a first range (e.g., between a first minimum and first maximum), the first curve 150A is selected. When the measured resistance 122 is in a second range (e.g., between a second minimum and second maximum), the second curve 150B is selected. When the measured resistance 122 is in a third range (e.g., between a third minimum and third maximum), the third curve 150C is selected. When the measured resistance 122 is in a fourth range (e.g., between a fourth minimum and fourth maximum), the fourth curve 150D is selected.

The voltage regulator 100 may use the same ranges (or thresholds) to switch between the curves 150A-D. For example, moving from the second curve 150B to the third curve 150C occurs when the measured resistance moves from the second range to the third range. However, different thresholds may be used when transitioning between the curves 150A-D. For example, the ranges (first range, second range, third range, and fourth range) are used when the measured resistance 122 is initially detected (e.g., when the load is initially connected to the electric machine or when the electric machine is turned on). Subsequently, modified ranges may be used for transitioning between the curves 150A-D. The ranges may be narrowed or widened. The thresholds of the ranges may be increased or decreased by a predetermined amount.

In another example, an additional transition test may be applied before the voltage regulator 100 transitions between the curves 150A-D. The transition test may be a speed threshold or a voltage threshold. For example, once the voltage regulator 100 has selected one of the curves 150A-D, the voltage regulator does not transition to another of the curves 150A-D until both the measured resistance 122 has been detected in another range and the transition test has been satisfied such that the speed of the electric machine has fallen before a transition speed threshold and/or the output voltage of the electric machine has fallen below a transition output threshold. The transition speed threshold may be a predetermined percentage of the rated speed. The transition output threshold may be a predetermined percentage of the nominal voltage.

Each of the curves 150A-D may include multiple regions. The curves 150A-D may include a low frequency region that is substantially horizontal, a high frequency region that is substantially horizontal, and a transition region. The transition region of each curve 150A-D may be defined by a slope. Each of curves 150A-D may include a different slope for the transition region. The slope extends from a first frequency value (the highest frequency for the low frequency region) to a second frequency level (the lowest frequency for the high frequency region). That is, the slope for a first curve of the plurality of voltage-frequency curves is different than the slope for a second curve of the plurality of voltage-frequency curves. Each of curves 150A-D may have different transition regions. That is, the high frequency region for the first curve may begin at a higher frequency than the next curve, and so on. Similarly, the lower frequency regions may be defined by different values.

As an alternative to the selection of the voltage-frequency curves, the voltage regulator 100 may modify the voltage-frequency ratio or a voltage-frequency curve in response to the resistance data or other sensing circuit data. Modified curves or new curves may be stored in memory.

Figure 5:
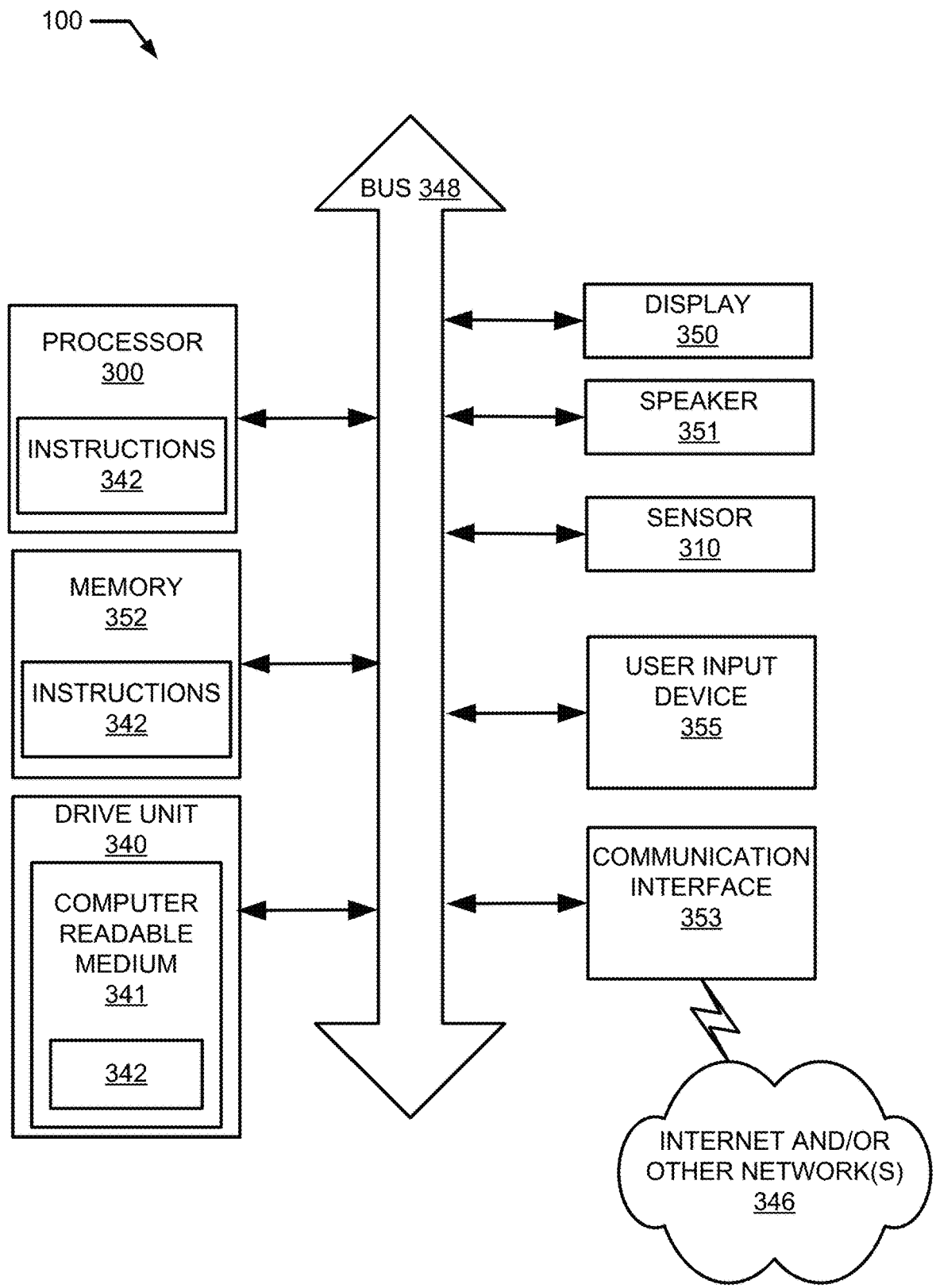
FIG. 5 illustrates an example controller for the voltage regulator.

FIG. 5 illustrates an example control system for the voltage regulator 100. The control system may include a processor 300, a memory 352, and a communication interface 353 for interfacing with devices or to the internet and/or other networks 346. In addition to the communication interface 353, a sensor interface may be configured to receive data from the sensor 310 or data from any source.

The components of the control system may communicate using bus 348. The control system may be connected to a workstation or another external device (e.g., control panel) and/or a database for receiving user inputs, system characteristics, and any of the values described herein. Optionally, the control system may include an input device 355 and/or a sensing circuit in communication with any of the sensors. The sensing circuit (e.g., sensor 310) receives sensor measurements from other components as described above. The input device 355 may include a touchscreen, a keyboard, a microphone for voice inputs, a camera for gesture inputs, and/or other inputs.

Optionally, the control system may include a drive unit 340 for receiving and reading non-transitory computer media 341 having instructions 342. Additional, different, or fewer components may be included. The processor 300 is configured to perform instructions 342 stored in memory 352 for executing the algorithms described herein. A display 350 may be supported by the generator 101 or provided otherwise. The display 350 may be combined with the user input device 355.

Figure 6:
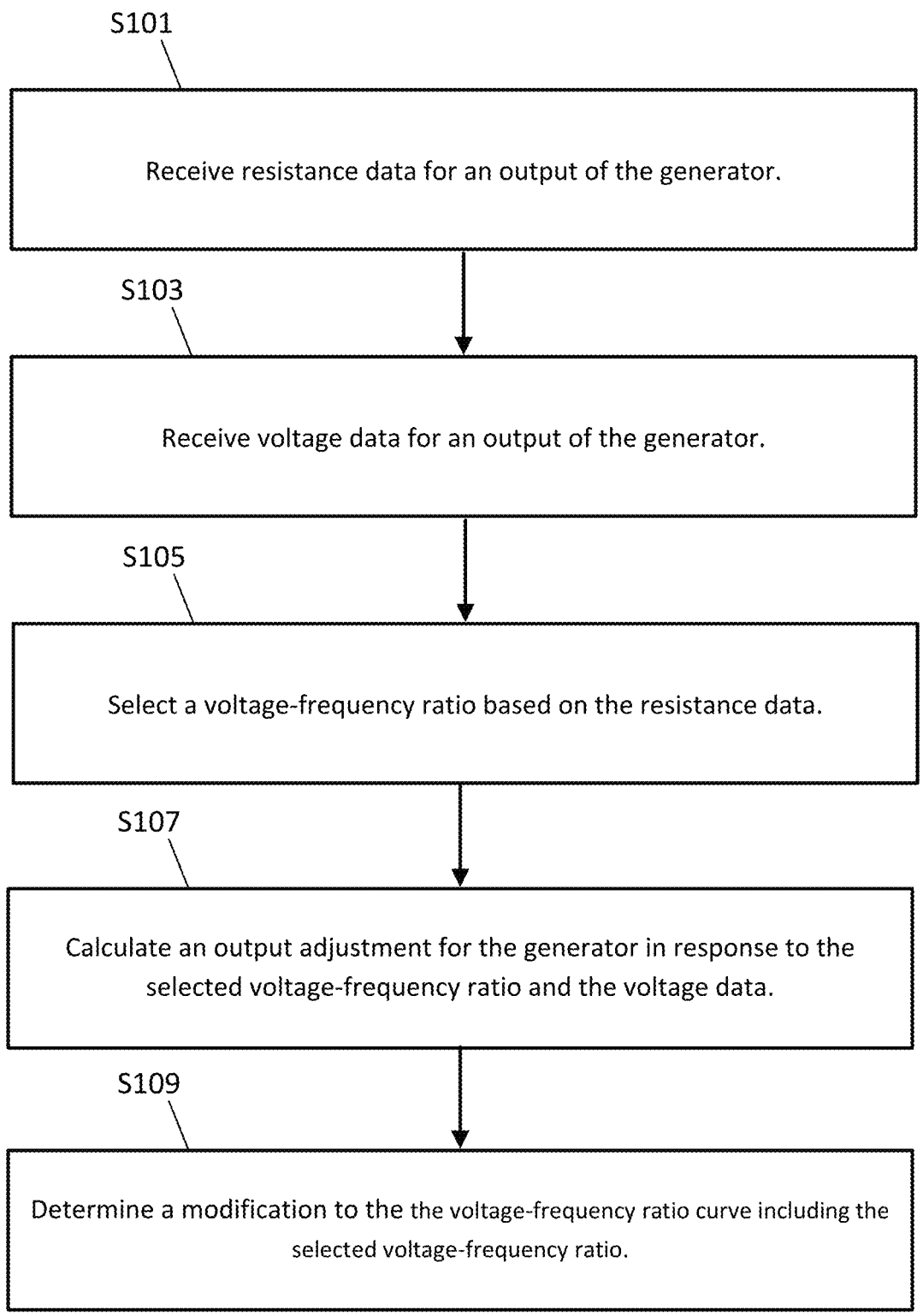
FIG. 6 illustrates an example flowchart for the controller of FIG. 5.

FIG. 6 illustrates an example flowchart for the control system of FIG. 5. Additional, different, or fewer acts may be included.

At act S101, the processor 300 or the communication interface 353 receives or identifies resistance data for the output of the generator 101. The resistance data may be measured through the current and voltage at the output of the generator 100. The resistance data may be a set value. The resistance data may be calculated based on the load devices connected to the generator 100. The resistance data may be entered by the user (e.g., via the user input device 355).

At act S103, the processor 300 or the communication interface 353 receives or identifies voltage data for the output of the generator 101. The voltage data may be sampled at the output of the generator 101 or elsewhere on the load circuit.

At act S105, the processor 300 selects a voltage-frequency ratio based on at least the resistance data. The memory 352 may include one or more arrays or tables of voltage and frequency/speed pairs A particular table or array is selected by the processor 300 in response to at least the resistance data. For example, each table or array may be associated with a resistance range such that detected resistances within the range cause the processor 300 to select the corresponding table or array. Other factors, such as the output voltage, may be used in selected the table or array.

At act S107, the processor 300 calculates an output adjustment for the generator 101 in response to the selected voltage-frequency ratio and the voltage data. The output adjustment may be implemented by changing the field current of the generator 101. The output adjustment may be implemented internally by the voltage regulator of the generator 101. The output adjustment may be provided by the display 350 to a user or through communication interface 353 to a server or central computer.

At step S109, the processor 300 determines the appropriate modifications for the voltage-frequency ratio array/table and saves the new curve data in memory 352. For example, once an initial array/table is selected, the ranges for other arrays/tables may be modified in order to lessen the effect of rapid switching between arrays/tables. In other examples, the array/tables may be modified over time in response to the measured output of the generator.

The processor 300 may include a general processor, digital signal processor, an application specific integrated circuit (ASIC), field programmable gate array (FPGA), analog circuit, digital circuit, combinations thereof, or other now known or later developed processor. The processor 300 may be a single device or combinations of devices, such as associated with a network, distributed processing, or cloud computing.

The memory 352 may be a volatile memory or a non-volatile memory. The memory 352 may include one or more of a read only memory (ROM), random access memory (RAM), a flash memory, an electronic erasable program read only memory (EEPROM), or other type of memory. The memory 352 may be removable from the network device, such as a secure digital (SD) memory card.

In addition to ingress ports and egress ports, the communication interface 353 may include any operable connection. An operable connection may be one in which signals, physical communications, and/or logical communications may be sent and/or received. An operable connection may include a physical interface, an electrical interface, and/or a data interface.

The communication interface 353 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium 341 (e.g., memory 352) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method for operation of a voltage regulator of a generator, the method comprising:
   receiving resistance data for an output of the generator;
   receiving voltage data for the output of the generator;
   selecting a voltage-frequency curve according to the resistance data;
   selecting a voltage-frequency ratio from the voltage-frequency curve according to a frequency associated with an output of the generator; and
   calculating an output adjustment for the generator in response to the selected voltage-frequency ratio and the voltage data.

2. The method of claim 1, wherein the voltage-frequency curve includes a slope extending from a first frequency value to a second frequency level.

3. The method of claim 1, wherein the voltage-frequency curve is selected from a plurality of voltage-frequency curves.

4. The method of claim 3, wherein a slope for a first curve of the plurality of voltage-frequency curves is different than a slope for a second curve of the plurality of voltage-frequency curves.

5. The method of claim 1, wherein the voltage-frequency ratio is selected from a voltage-frequency curve according to a speed of an engine coupled to the generator.

6. The method of claim 1, further comprising:
   receiving speed data for the generator, wherein the output adjustment is calculated based on the speed data and the selected voltage-frequency ratio.

7. The method of claim 1, further comprising:
   identifying a target output for the generator in response to voltage data; and
   summing the target output and the output adjustment.

8. The method of claim 1, further comprising:
modifying a voltage-frequency curve in response to the resistance data, wherein the voltage-frequency curve provides the voltage-frequency ratio.

9. A voltage regulator for a generator having a dynamic voltage-to-frequency (V/F) ratio, the voltage regulator comprising:
- a memory configured to store a plurality of voltage-frequency curves for the generator;
- a voltage calculator configured to receive data indicative of an output of the generator and configured to determine a resistance value from the output of the generator and a voltage value from the output of the generator; and
- a selection module configured to select a voltage-frequency curve from the plurality of voltage-frequency curves in response to the resistance value and configured to select a voltage-frequency ratio from the selected voltage-frequency curve in response to the voltage value,
  wherein an output adjustment for the generator in response to the selected voltage-frequency ratio.

10. The voltage regulator of claim 9, wherein the voltage-frequency ratio is selected from a voltage-frequency curve according to a frequency associated with the output of the generator.

11. The voltage regulator of claim 9, wherein each of the plurality of voltage-frequency curves includes a slope extending from a first frequency value to a second frequency level.

12. The voltage regulator of claim 11, wherein the slope for a first curve of the plurality of voltage-frequency curves is different than the slope for a second curve of the plurality of voltage-frequency curves.

13. The voltage regulator of claim 9, wherein the voltage-frequency ratio is selected from the selected voltage-frequency curve according to a speed of an engine coupled to the generator.

14. The voltage regulator of claim 9, wherein the output adjustment is calculated based on speed data and the selected voltage-frequency ratio.

15. The voltage regulator of claim 9, further comprising:
a controller configured to identify a target output for the generator in response to voltage data add the target output and the output adjustment.

16. An engine-generator set comprising:
an engine;
a generator; and
a voltage regulator comprising:
- a memory configured to store a plurality of voltage-frequency curves for the generator;
- a voltage calculator configured to receive data indicative of an output of the generator and configured to determine a resistance value from the output of the generator and a speed value; and
- a selection module configured to select a voltage-frequency curve from the plurality of voltage-frequency curves in response to the resistance value and configured to select a voltage-frequency ratio from the selected voltage-frequency curve in response to the speed value,
  wherein an output adjustment for the generator in response to the selected voltage-frequency ratio.

17. The engine-generator of claim 16, wherein the speed value indicates a speed of the engine.

18. The engine-generator of claim 16, wherein the speed value indicates a frequency for an output of the generator.

* * * * *